Figure 1:
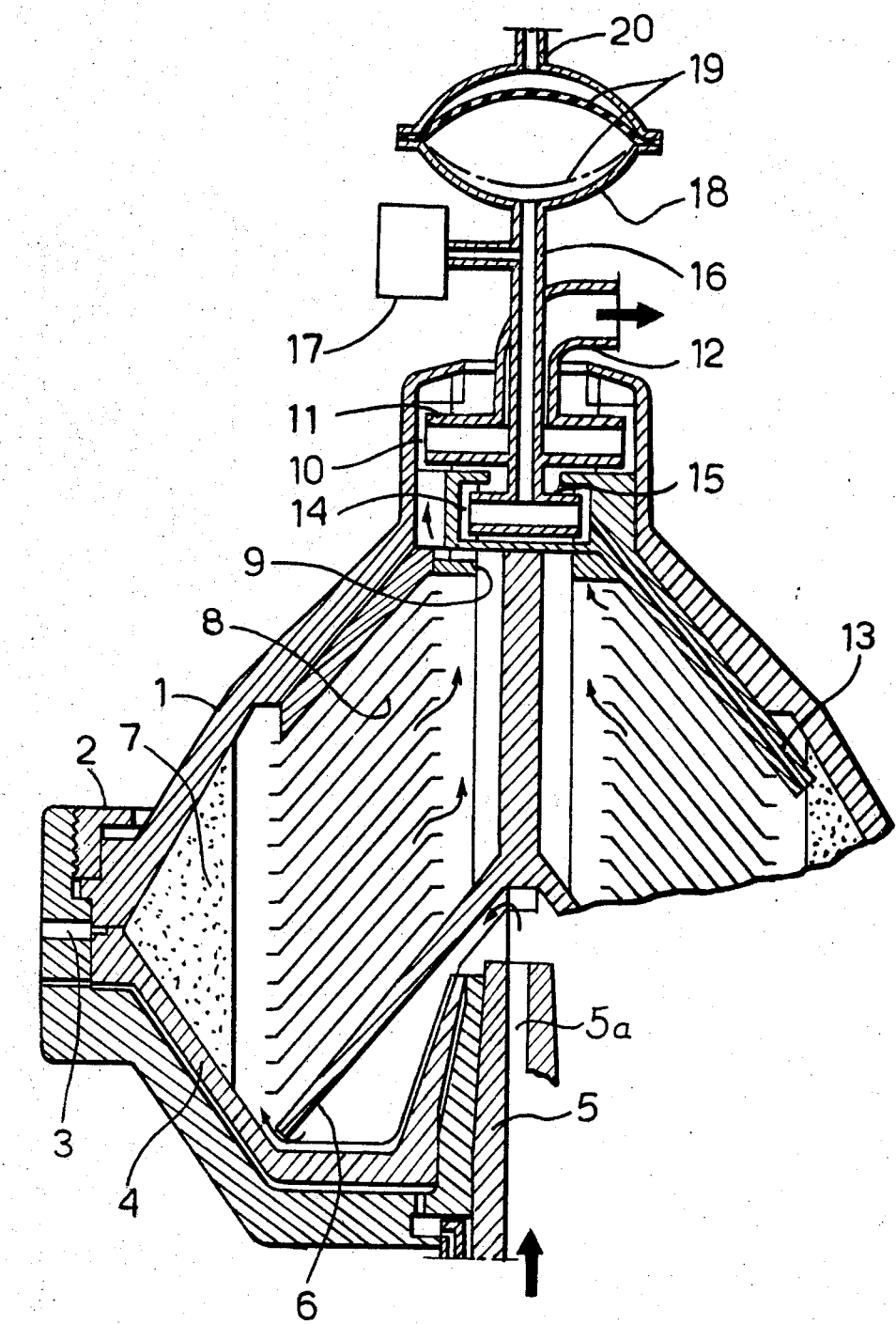

United States Patent

[11] 3,563,453

[72] Inventors: Paul Kompert, Stockholm; Carl-Goran Nilson, Tullinge, Sweden
[21] Appl. No.: 800,908
[22] Filed: Feb. 20, 1969
[45] Patented: Feb. 16, 1971
[73] Assignee: Alfa-Laval Ab, Tumba, Sweden
[32] Priority: Feb. 23, 1968
[33] Sweden
[31] 2343/1968

[54] METHOD AND APPARATUS FOR INDICATING SLUDGE LEVEL IN SLUDGE CENTRIFUGE
8 Claims, 3 Drawing Figs.

[52] U.S. Cl. ................................................. 233/20
[51] Int. Cl. ............................................... B04b 11/00
[50] Field of Search ................................. 233/19.20

[56] References Cited
UNITED STATES PATENTS

| | | | |
|---|---|---|---|
| 3,167,509 | 1/1965 | Steinacker | 233/20 |
| 3,301,476 | 1/1967 | Hemfort | 233/20 |
| 3,396,910 | 8/1968 | Steinacker | 233/20 |
| 3,408,000 | 10/1968 | Nilson | 233/20X |
| 3,410,479 | 11/1968 | Nilson | 233/20 |
| 3,445,061 | 5/1969 | Nilson | 233/20 |

Primary Examiner—William I. Price
Attorney—Davis, Hoxie, Faithfull & Hapgood

ABSTRACT: The centrifugal rotor is provided with a channel extending inwardly from the sludge space toward the axis of the rotor, and a reciprocating movement is imparted to a quantity of liquid in this channel. When the outer end of the channel becomes clogged by accumulated sludge, a substantial change occurs in the resistance to movement of the reciprocating liquid, and this change is sensed to indicate the sludge level.

INVENTORS
PAUL KOMPERT
CARL-GORAN NILSON

METHOD AND APPARATUS FOR INDICATING SLUDGE LEVEL IN SLUDGE CENTRIFUGE

THE DISCLOSURE

This invention relates to a method and apparatus for indicating the sludge level in the sludge space of the rotor sludge centrifuges.

Apparatus for this purpose is disclosed in Swedish Pat. specification No. 213,946 and comprises a channel extending from the sludge space toward the axis of the rotor, and a measuring means connected to this channel. This prior apparatus has the disadvantage that when an inward flow occurs through the channel, there is a risk that sludge from the sludge space will reach the measuring means and impair its operation. On the other hand, when an outward flow of liquid occurs through the channel, and even if this flow is intermittent, there is a risk that sludge at the opening of the channel into the sludge space will be flushed away, with concomitant insufficient accuracy in the sensing of the sludge level.

The present invention has for its principal object to eliminate these disadvantages and is characterized in that a reciprocating movement is imparted to a liquid in quantity continued in the aforesaid channel, and changes in resistance to the reciprocating movement are sensed. In this way, the advantage is gained that no liquid can flow past the measuring means to impair such means and that there is a reduced risk of a liquid push flushing away sludge from the surface of the sludge level at the opening of the channel into the sludge space. If a small amount of sludge should be flushed away from the channel opening in one moment, it is sucked back in the next moment, whereby the sludge level at the channel opening remains unaffected by the reciprocating liquid movements.

An apparatus made according to the invention comprises means for imparting a reciprocating movement to the liquid quantity contained in the channel, and means for sensing when the resistance to such movement undergoes a change due to the clogging of the outer end of the channel by accumulated sludge. The sensing means can be so designed that it is possible to read off, for example visually, the movements of the reciprocating liquid quantity. A cessation of these movements indicates that the separated sludge has accumulated in the rotor to the point where it is desirable to discharge the sludge. According to a preferred embodiment, however, the sensing means is a pressure sensing device arranged so as to initiate a sludge discharge automatically in a conventional manner.

In one embodiment of the new apparatus, the inner end of the aforesaid channel communicates with a chamber having a movable wall, such as a piston or a diaphragm, and means are provided for imparting a reciprocating movement to this wall. The movements of the wall can actuate the liquid quantity contained in the channel, by way of a coherent liquid column. The movements of the liquid quantity in one direction can be generated by a centripetal pump, such as a paring disc located in the central part of the rotor. The movements in the other direction are then generated in a simple way by intermittently subjecting the movable wall to a pressure which acts in the opposite direction to the pressure generated by the pump.

If the connection of the sensing means to the channel is kept filled with gas, as by blowing air into the connection, so that the gas by corresponding pressure changes transmits the influence of the movements of the liquid quantity on the sensing means, a corrosive or other adverse effect of liquid on the sensing means is avoided.

When separating beer, for example, yeast cells easily form deposits in the connection between the aforesaid channel and the means for imparting a reciprocating movement to the liquid quantity contained in the channel. These yeast deposits are difficult to flush away. In order to avoid this disadvantage, it may be desirable to provide a gas-filled chamber connected to the channel, and a means for imparting pulsating pressure changes to the gas filling, these changes serving to generate the reciprocating movement. In a preferred embodiment, the sensing means are connected to the channel by a level sensing device located in a central chamber of the centrifugal rotor, the gas filling being a gas cushion contained in the central chamber. A resistance to the reciprocating movement of the liquid quantity in the channel appears in the form of a corresponding liquid level change in the part of the central chamber where the sensing means is located, this change being indicated by the sensing means.

Figure 3:
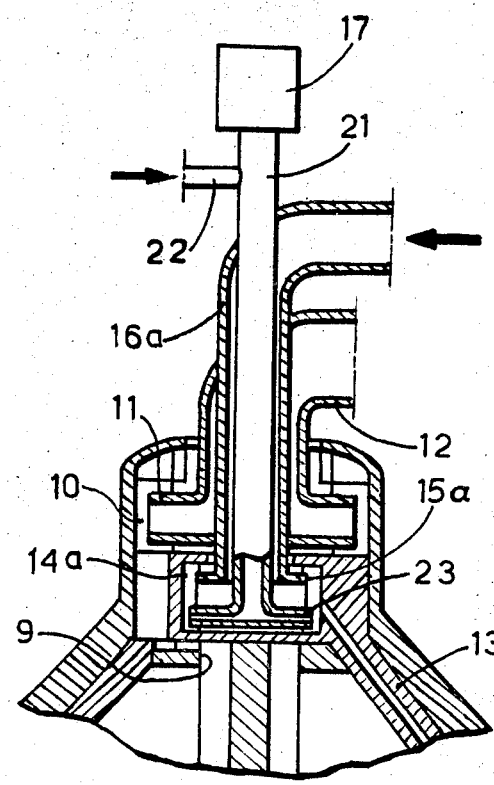
Figure 2:
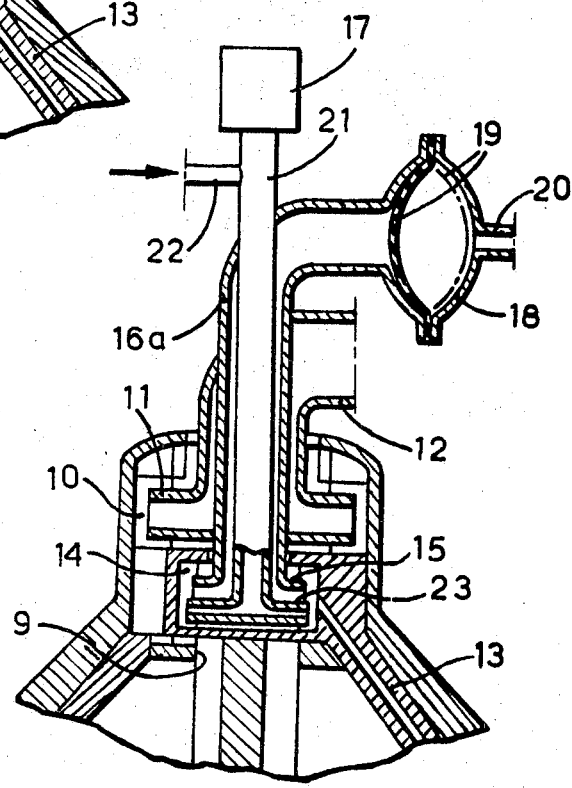

The invention is described more in detail below, reference being had to the accompanying drawings in which FIGS. 1, 2 and 3 are vertical sectional views of different embodiments of the new apparatus. In the different FIGS., corresponding parts have the same reference numerals.

In FIG. 1, a centrifugal rotor 1 is comprised of two parts which are secured together by means of a locking ring 2. In the rotor wall are sludge outlet openings 3 which are opened and closed in a conventional manner by means of a valve piston 4. The rotor is carried and driven by a hollow shaft 5 having a central vertical channel 5a through which liquid to be separated is supplied to the separating space of the rotor. The liquid enters this space under the lower edge of a distributor 6. The centrifugally separated sludge forms a layer 7, whereas purified liquid is led inwardly through a disc set 8 to the central part of the rotor and leaves this part by way of an overflow outlet 9. The liquid flows from this outlet into a paring chamber 10 of the rotor and is discharged by a stationary paring disc 11. The latter is connected to an outlet pipeline 12 for purified liquid.

An indicating pipe 13 is provided in the rotor and forms a channel having its outer end opening into the sludge space. This channel opens at its inner end into a paring chamber 14 in which a stationary paring disc 15 is provided. The disc 15 is connected to a pipeline 16 on which is mounted a conventional pressure sensing means 17 adapted to sense a pressure change sufficiently great to signal for a sludge discharge. A housing 18 is connected to the pipeline 16 and contains a diaphragm 19 movable between an upper position shown by full lines and a lower position shown by a broken line. At the top, the housing 18 has a pipe connection 20 through which the diaphragm 19 is subjected to a pulsating pressure, which may be either hydraulic or pneumatic.

In the operation of the FIG. 1 apparatus, the paring disc 15 pumps liquid from the paring chamber 14 upward into the housing 18 and thus presses the diaphragm 19 upward. When a pressure impulse from the pipe connection 20 presses the diaphragm downward against the action of the paring disc pressure, a liquid quantity corresponding to the diaphragm movement is displaced from the paring chamber 14 and through the pipe 13 into the sludge space. When the pressure against the upper side of the diaphragm 19 decreases, the same liquid quantity is sucked back into pipe 13 by the pumping action of the paring disc 15. The sensing means 17 indicates all pressure changes in the pipeline 16. When the level of the sludge layer 7 has reached the opening at the outer end of the pipe 13, this opening is clogged by the sludge. This means that when the diaphragm 19 is subjected to a pressure impulse from above, no corresponding liquid quantity can penetrate into the sludge space, but instead the liquid level in the paring chamber 14 will move inward. As a result, the pressure generated by the paring disc 15 in the pipeline 16 rises substantially, and this increase is indicated by the sensing means 17. When the indication becomes sufficiently strong, the sensing means 17 signals for sludge discharge, and such discharge may be effected automatically under control of the sensing means in a conventional manner.

Alternatively, the upper side of diaphragm 19 can be subjected to a pressure from the pipe connection 20 which is sufficient to depress the diaphragm against the pumping action of the paring disc 15. When this pressure on the upper side of the diaphragm is reduced, the diaphragm is displaced upward by the pressure from paring disc 15, so that a corresponding quantity of liquid is sucked into paring chamber 14 through pipe 13. However, when the opening at the outer end of pipe 13 becomes clogged by sludge, there will be no such sucking of liquid into paring chamber 14, and the liquid level in chamber 14 will therefore move outward. Such outward displacement of the liquid level has the effect of substantially decreasing the pressure generated in pipeline 16 by the pumping action of paring disc 15, and this pressure change is sensed by the sensing means 17 to indicate that the sludge level has reached the point where a sludge discharge should be initiated.

The improved embodiment illustrated in FIG. 2 is adapted to completely eliminate corrosive or other adverse action of liquid on the sensing means 17. In FIG. 2, the paring disc 15 is connected to a pipeline 16a which in turn is connected to the housing 18. The sensing means 17 is mounted on a pipe 21 passing centrally through the pipeline 16a. Air is blown into the pipe 21 through a connection 22 and is forced from pipe 21 into the paring chamber 14 through a disc 23. The parts 13, 15, and 18 operate in the same manner as FIG. 1. The sensing means 17 indicate the resistance encountered by the air blowing out from the disc 23, and this resistance is determined by the position of the liquid level in the paring chamber 14. When the opening of the pipe 13 into the sludge space is clogged with sludge, this level is displaced inward so that the sensing means 17 indicate an increased pressure.

If in the embodiment according to FIG. 2 beer, for example, is separated, yeast cells can form deposits on the left-hand side of the diaphragm 19 in the housing 18 or in the pipeline 16a. These deposits will be difficult to remove. In such case, it is advantageous to use the embodiment according to FIG. 3. Here, air is blown intermittently through the pipeline 16a into the interspace between the disc 23 and the disc 15a located in chamber 14a. As long as the opening of the pipe 13 into the sludge space is not clogged with sludge, liquid is displaced by the air from the space between the discs 15a and 23 outwardly through the pipe 13. On the other hand, when the pipe opening has been clogged by sludge, the liquid level located in the chamber 14a outside the discs 15a and 23 moves inward owing to the air blow. This level displacement is indicated as an increased pressure by the sensing means 17.

We claim:

1. In the operation of a sludge centrifuge having a rotor provided with a channel extending from the sludge-collecting space toward the rotor axis, a method of indicating the sludge level in said space, the method comprising the steps of imparting a reciprocating movement to a liquid quantity in said channel, and sensing a change in the resistance to said movement which occurs when sludge at least partly clogs the opening of said channel into the sludge-collecting space.

2. In combination with a sludge centrifuge including a centrifugal rotor having a space for collecting separated sludge and also having a channel extending from said space toward the rotor axis, apparatus for indicating the sludge level in said space and comprising mean for imparting a reciprocating movement to a quantity of liquid in said channel, and means communicating with said channel for sensing a change which occurs in the resistance to said reciprocating movement in response to at least partial clogging of the opening of said channel into the sludge space.

3. The combination according to claim 2, in which said sensing means are pressure sensing means.

4. The combination according to claim 2, in which said means for imparting a reciprocating movement include a chamber communicating with said channel and having a movable wall, and means for reciprocating said wall.

5. The combination according to claim 2, in which said means for imparting a reciprocating movement include a chamber communicating with said channel and having a movable wall, means for reciprocating said wall to generate movement of the liquid quantity in one direction, and a centripetal pump located in the central portion of the rotor and operable to generate movement of said liquid quantity in the opposite direction.

6. The combination according to claim 2, comprising also means for maintaining a volume of gas through which the sensing means communicate with said channel.

7. The combination according to claim 2, in which said means for imparting a reciprocating movement include a gas-filled chamber communicating with said channel, and means for imparting pulsating pressure changes to the gas filling said chamber.

8. The combination according to claim 7, in which said sensing means include a level sensing means communicating with the channel and located in a central chamber in the rotor, said gas filling being a gas cushion in the central chamber.